United States Patent
Iida et al.

(10) Patent No.: US 7,251,359 B2
(45) Date of Patent: Jul. 31, 2007

(54) IMAGE PROCESSING APPARATUS AND METHOD THAT USE SAMPLE SPECTRAL DISTRIBUTION DATA SELECTED BASED ON COLOR DATA FROM AN OBJECT TO ESTIMATE SPECTRAL DISTRIBUTION OF A WAVELENGTH REGION

(75) Inventors: Yoshiko Iida, Tokyo (JP); Takeshi Makita, Shizuoka (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 10/006,724

(22) Filed: Dec. 10, 2001

(65) Prior Publication Data

US 2002/0071605 A1 Jun. 13, 2002

(30) Foreign Application Priority Data

Dec. 12, 2000 (JP) ............................. 2000-378020

(51) Int. Cl.
*G06K 9/00* (2006.01)
(52) U.S. Cl. ........................ 382/167; 382/162; 356/939
(58) Field of Classification Search ................ 382/165, 382/167, 162, 100; 356/939
See application file for complete search history.

(56) References Cited

U.S. PATENT DOCUMENTS

| | | | | | |
|---|---|---|---|---|---|
| 4,716,456 A | * | 12/1987 | Hosaka | ........................ | 358/509 |
| 5,633,953 A | * | 5/1997 | Kouzaki | ..................... | 382/167 |
| 5,742,296 A | | 4/1998 | Yamada et al. | ............. | 345/431 |
| 5,864,364 A | | 1/1999 | Ohyama et al. | ............ | 348/211 |
| 5,909,512 A | | 6/1999 | Ohshima et al. | ............. | 382/251 |
| 5,933,252 A | | 8/1999 | Emori et al. | ................. | 358/500 |
| 6,333,757 B1 | * | 12/2001 | Faris | ........................... | 348/60 |
| 6,614,471 B1 | * | 9/2003 | Ott | ............................. | 348/238 |
| 6,897,988 B1 | * | 5/2005 | Saito et al. | ................. | 358/515 |
| 6,980,231 B1 | * | 12/2005 | Ohsawa | ....................... | 348/188 |
| 2002/0060803 A1 | * | 5/2002 | Iida et al. | .................. | 358/1.13 |
| 2003/0161530 A1 | * | 8/2003 | Yamada et al. | ............. | 382/167 |

FOREIGN PATENT DOCUMENTS

JP 9172649 6/1997

OTHER PUBLICATIONS

Color Reproduction of Hard Copy, "New Version of Color Science Handbook 2$^d$ Edition", Tokyo Daiguku Shuppankai Publisher, Jun. 10, 1998, Tokyo, p. 1194 to 1197 (with translation).

* cited by examiner

*Primary Examiner*—Matthew C. Bella
*Assistant Examiner*—Shefali Patel
(74) *Attorney, Agent, or Firm*—Fitzpatrick, Cella, Harper & Scinto

(57) ABSTRACT

Estimating the spectral distribution of an object requires not only the time of image sensing by a multi-spectrum camera but also, in order to process all band information acquired, large amounts of memories for storing all the band information of all pixels, and the processing time for processing all the band information. In this invention, when the spectral distribution data of a total wavelength region is to be estimated from color data and a plurality of spectral distribution data different in wavelength region, the color data is acquired, and, on the basis of the configuration of spectral distribution data defined in accordance with the acquired color data, spectral distribution data necessary for the estimation is acquired. In this way, the spectral distribution data of the total wavelength region is estimated.

6 Claims, 16 Drawing Sheets

FIG. 7

| COLOR DATA | NUMBER OF BANDS | COUNT VALUE | BAND NUMBER |
|---|---|---|---|
| DATA0 | 3 | 0 | 3 |
| | | 1 | 6 |
| | | 2 | 8 |
| DATA1 | 4 | 0 | 2 |
| | | 1 | 7 |
| | | 2 | 8 |
| | | 3 | 12 |
| ⋮ | ⋮ | ⋮ | ⋮ |

FIG. 8

| BAND NUMBER | FILTER NUMBER | SPECTRAL DISTRIBUTION CHARACTERISTIC |
|---|---|---|
| 0 | 0 | A |
| 1 | 1 | B |
| 2 | 2 | C |
| 3 | 3 | D |
| ⋮ | ⋮ | ⋮ |

IMAGE PROCESSING APPARATUS AND METHOD THAT USE SAMPLE SPECTRAL DISTRIBUTION DATA SELECTED BASED ON COLOR DATA FROM AN OBJECT TO ESTIMATE SPECTRAL DISTRIBUTION OF A WAVELENGTH REGION

FIELD OF THE INVENTION

The present invention relates to an image processing apparatus and method and, more particularly, to an image processing apparatus and method which accurately estimate the display color of an acquired object, regardless of the conditions of observation illuminating light, by using the spectral distribution data of the object.

BACKGROUND OF THE INVENTION

The method most often used in apparatuses which acquire spectral distribution data is to divide into bands a wavelength region (to be referred to as a "total wavelength region" hereinafter) to be measured such as a visible light region, acquire the spectral distribution information of each band, and acquire the spectral distribution information of the total wavelength region from the results.

FIG. 1 is a block diagram showing the arrangement of a multi-spectrum camera 207 for acquiring spectral distribution data.

A plurality of filters having spectral characteristics different in wavelength are arranged along the periphery of a disk-like rotary filter 202 in order of band wavelength. Reflected light from an object to be sensed passes through an optical system 201 and through one filter on the rotary filter 202, and is decomposed into light indicative of band information. By rotating the rotary filter 202 placed before a CCD sensor 204 by a driving motor 203, filters facing this CCD sensor 204 are switched, and input light is decomposed into light indicating each set of band information (that is, the information for each band).

The intensity of the light indicating band information is converted into a digital signal value by the CCD sensor 204 and an A/D converter 205, and stored as data in units of pixels into a data storage unit 206.

Generally, the smaller the number of filters of the rotary filter 202, the shorter the processing time required for sampling and the higher the speed of image sensing. Therefore, the number of filters is minimized.

As indicated by the solid lines in FIG. 2, the spectral distribution data acquired by the multi-spectrum camera 207 is the information of each band decomposed by the corresponding filter. Hence, this data cannot be directly used as the spectral distribution data of the total wavelength region. Therefore, it is necessary to acquire the spectral distribution data of the total wavelength region by interpolating the information of each band. Note that the spectral distribution data of the total wavelength region will be called "multi-spectral distribution data", with respect to band information acquired by the multi-spectrum camera 207.

In this interpolation, as shown in FIG. 2, an intensity value corresponding to the intermediate wavelength of each band is defined as band information (indicated by ● in FIG. 2). These pieces of band information are connected by a curve (indicated by the broken line in FIG. 2) to obtain multi-spectral distribution data as the spectrum interpolation result. FIG. 2 shows the spectral characteristic acquired by the multi-spectrum camera 207 having six filters. In this case, multi-spectral distribution data must be estimated by using band information having six fixed filter characteristics.

Methods other than the above interpolation process are available by which the spectral distribution data of the total wavelength region is obtained by using band information. One method will be explained below.

A function for obtaining an output value at a wavelength $\lambda$ of the spectral distribution data information of each decomposed band is defined as $Ln(\lambda)$ where n=1, 2, ... n corresponds to the information of each decomposed band. Spectral distribution data $R(\lambda)$ of the total wavelength region is calculated as a linear sum at different wavelengths of $Ln(\lambda)$ given by $$R(\lambda) = \sum_\lambda \{a1 \cdot L1(\lambda) + a2 \cdot L2(\lambda) + \ldots + an \cdot Ln(\lambda)\} \quad (1)$$

where a1, a2, ..., an are arbitrary coefficients which can be different from one wavelength $\lambda$ to another In addition to the above method, methods represented by the KL expanding method are known by which the spectral distribution data of the total wavelength region is obtained from band information. Accordingly, an optimum method is properly used in accordance with, e.g., the characteristics of band information.

A technique which realizes perfect color matching between environments differing in environmental illuminating light, i.e., environments having illuminating lights different in spectral distribution is disclosed in, e.g., Japanese Patent Laid-Open No. 9-172649. Since this technique uses spectral distribution data, it is necessary to acquire the multi-spectral distribution data of illuminating light by using the multi-spectrum camera 207 as shown in FIG. 1, i.e., to estimate the spectral distribution of illuminating light.

Estimating the spectral distribution requires not only the image sensing time of the multi-spectrum camera 207 but also, in order to process all band information acquired, large amounts of memories for storing all band information in units of pixels and working buffer memories. In addition, a processing time for processing all the band information is necessary.

Furthermore, to avoid errors produced by the interpolation process described above, it is necessary to use complicated interpolation and increase the number of band information. This increases the load (time) of image sensing and processing.

SUMMARY OF THE INVENTION

The present invention has been made to individually or collectively solve the above problems, and has as its object to reduce the load (time) of image sensing and processing when estimating a spectral distribution.

To achieve the above object, one preferred aspect of the present invention discloses an image processing apparatus that comprises first and second acquisition sections, the first being arranged to acquire color data of an object, and the second, to acquire spectral distribution data, which is necessary to estimate spectral distribution data of a total wavelength region, from a plurality of spectral distribution data in accordance with the acquired color data. Also provided is an estimator, arranged to estimate the spectral distribution data of the total wavelength region on the basis of the spectral distribution data acquired by the second acquisition section.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view for explaining a look-up table stored in a band count value storage;

FIG. 8 is a view for explaining a look-up table stored in a band number storage;

DETAILED DESCRIPTION OF THE PREFERRED EMBODIMENT

An image processing apparatus of an embodiment according to the present invention will be described in detail below with reference to the accompanying drawings.

[Arrangement]

Figure 1:
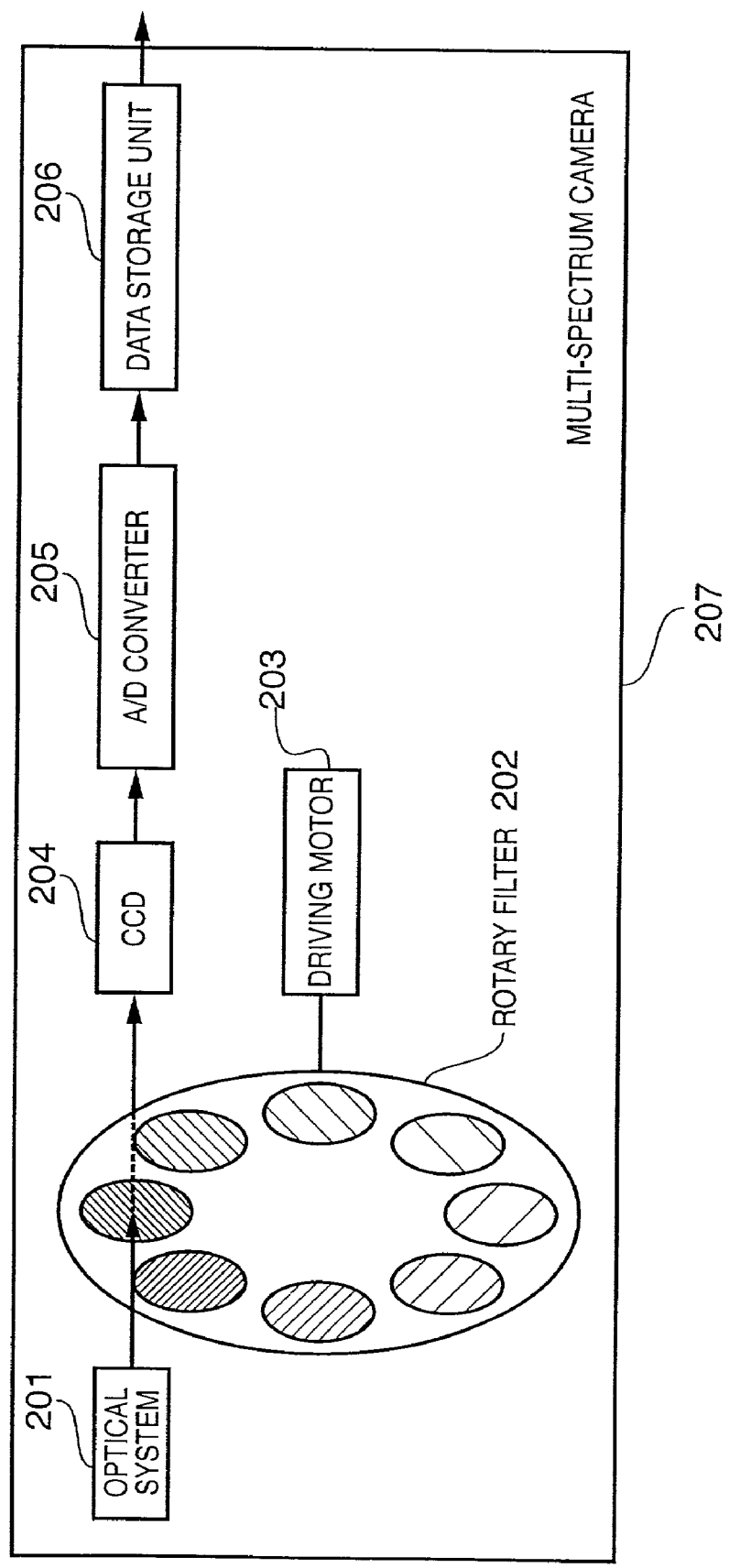
FIG. 1 is a block diagram showing the arrangement of a multi-spectrum camera for acquiring spectral distribution data.
Figure 2:
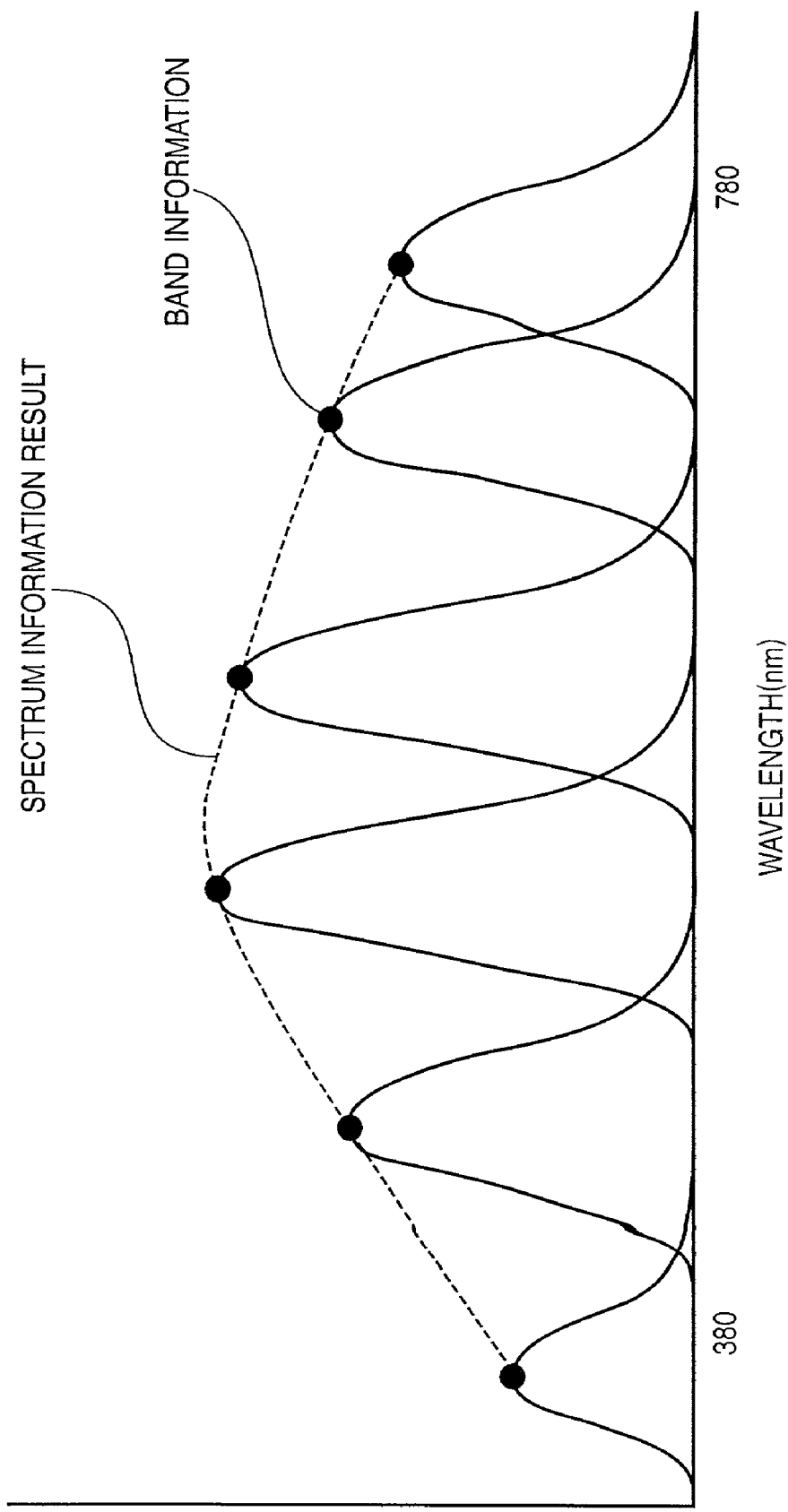
FIG. 2 is a graph for explaining the spectral distribution data acquired by the multi-spectrum camera.
Figure 3:
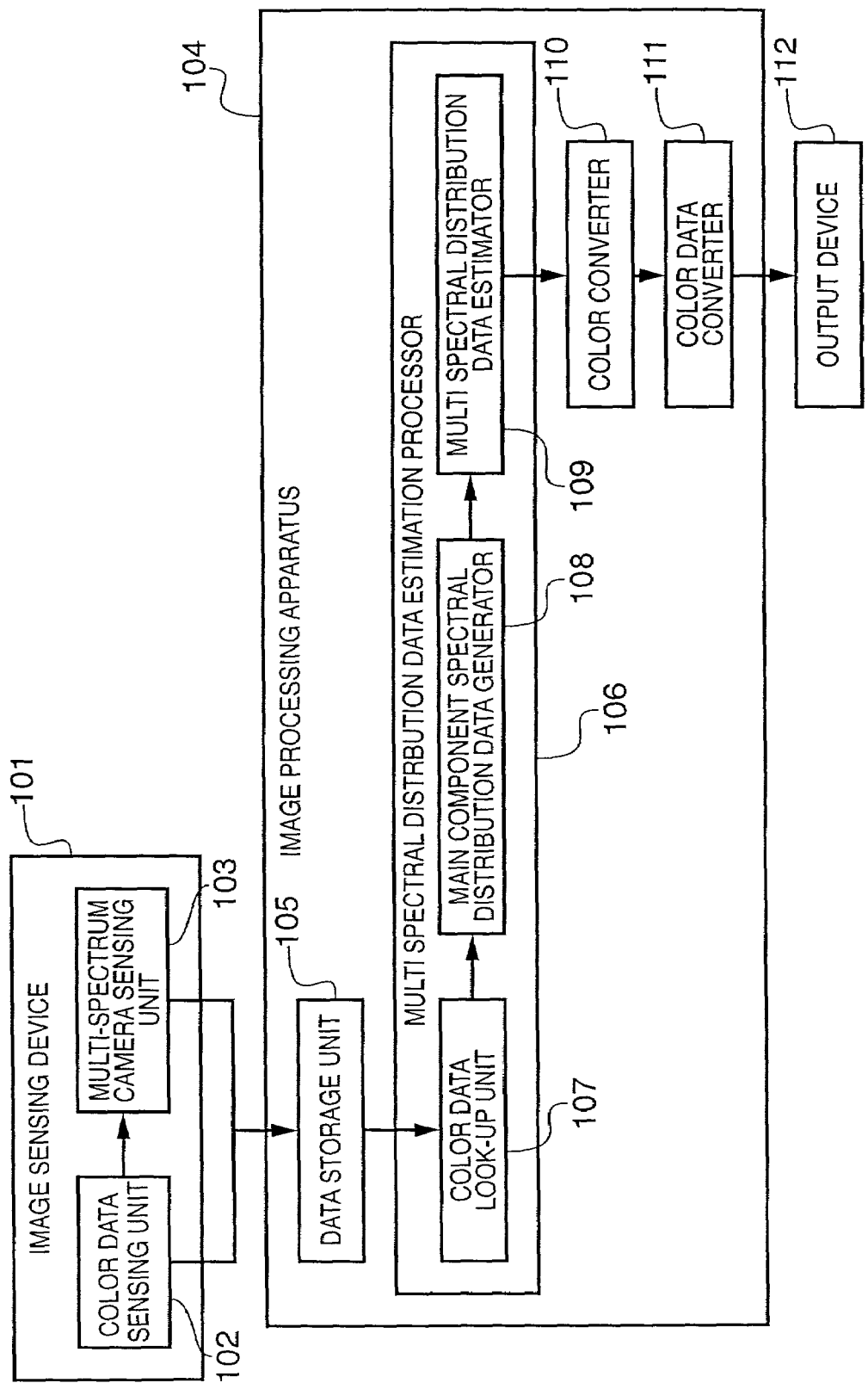
FIG. 3 is a block diagram showing the arrangements of an image sensing device for sensing an object and an image processing apparatus.

FIG. 3 is a block diagram showing the arrangements of an image sensing device 101 for sensing an image of an object and an image processing apparatus 104.

The image sensing device 101 comprises a color data sensing unit 102 for acquiring the color data of each pixel of an input image, and a multi-spectrum camera sensing unit 103 for acquiring that spectral distribution data of each pixel of the input image, which is defined by the acquired color data. Note that the color data sensing unit 102 can also be a color data sensing device connected to the multi-spectrum camera.

Note also that the multi-spectrum camera sensing unit 103 can be a multi-spectrum image sensing device as follows. That is, filters for acquiring band spectral distribution data differing in wavelength are used in image sensing by the above multi-spectrum camera, such that all of these filters are used to cover the total wavelength region, thereby always acquiring the spectral distribution data of all pixels. When this data from the image sensing device 101 is stored into a data storage unit 105, that spectral distribution data of each pixel of the input image, which is defined by the acquired color data, is stored, and the subsequent image processing is performed.

Furthermore, as will be described in detail later, the multi-spectrum camera can also include dedicated filters for previously defined specific colors. If it is determined that a previously defined specific color exists in acquired color data, a dedicated filter for that specific color is used additionally to sense all pixels. The multi-spectrum camera sensing unit 103 can also be a multi-spectrum image sensing device like this.

The arrangement of the multi-spectrum camera sensing unit 103 can also be a multi-spectrum image sensing device as follows. That is, of filters of the multi-spectrum camera, all previously defined filters are used to always acquire the spectral distribution data of all pixels. When this data from the image sensing device 101 is stored into the data storage unit 105, that spectral distribution data of each pixel of the input image, which is defined by the acquired color data, is stored, and the subsequent image processing is performed.

The output image signal data (the color data and the spectral distribution data defined by this color data) from the image sensing device 101 is stored in the data storage unit 105 of the image processing apparatus 104.

A color data look-up unit 107 stores information for forming main component spectral distribution data required by a main component spectral distribution data generator 108 to estimate multi-spectral distribution data by referring to the acquired color data and the spectral distribution data.

A multi-spectral distribution data estimator 109 estimates the multi-spectral distribution data of each pixel from the generated main component spectral distribution data and/or the spectral distribution data defined by the acquired color data.

The color data look-up unit 107, the main component spectral distribution data generator 108, and the multi-spectral distribution data estimator 109 construct a multi-spectral distribution data estimation processor 106.

A color converter 110 converts the color of the multi-spectral distribution data of each desired pixel by using the estimated multi-spectral distribution data. A color data converter 111 converts the color-converted, multi-spectral distribution data of each pixel into color data used in an output device 112.

This output device 112 outputs an image by using the output color data from the image processing apparatus 104.

[Multi-Spectral Distribution Data Estimation Method]

This embodiment notes that sets of band information necessary to estimate spectral distribution data and the number of these sets of band information are specified for a certain arbitrary color. That is, the multi-spectrum camera senses spectral distribution data in accordance with a color specified by color data in an input image. Spectral distribution data is estimated by sets of arbitrary band information specified by the color data value of the sensed spectral distribution data and the number of these pieces of arbitrary band information. In this estimation, sets of band information and the number of these sets of band information are varied in accordance with the color data value.

Figure 4:
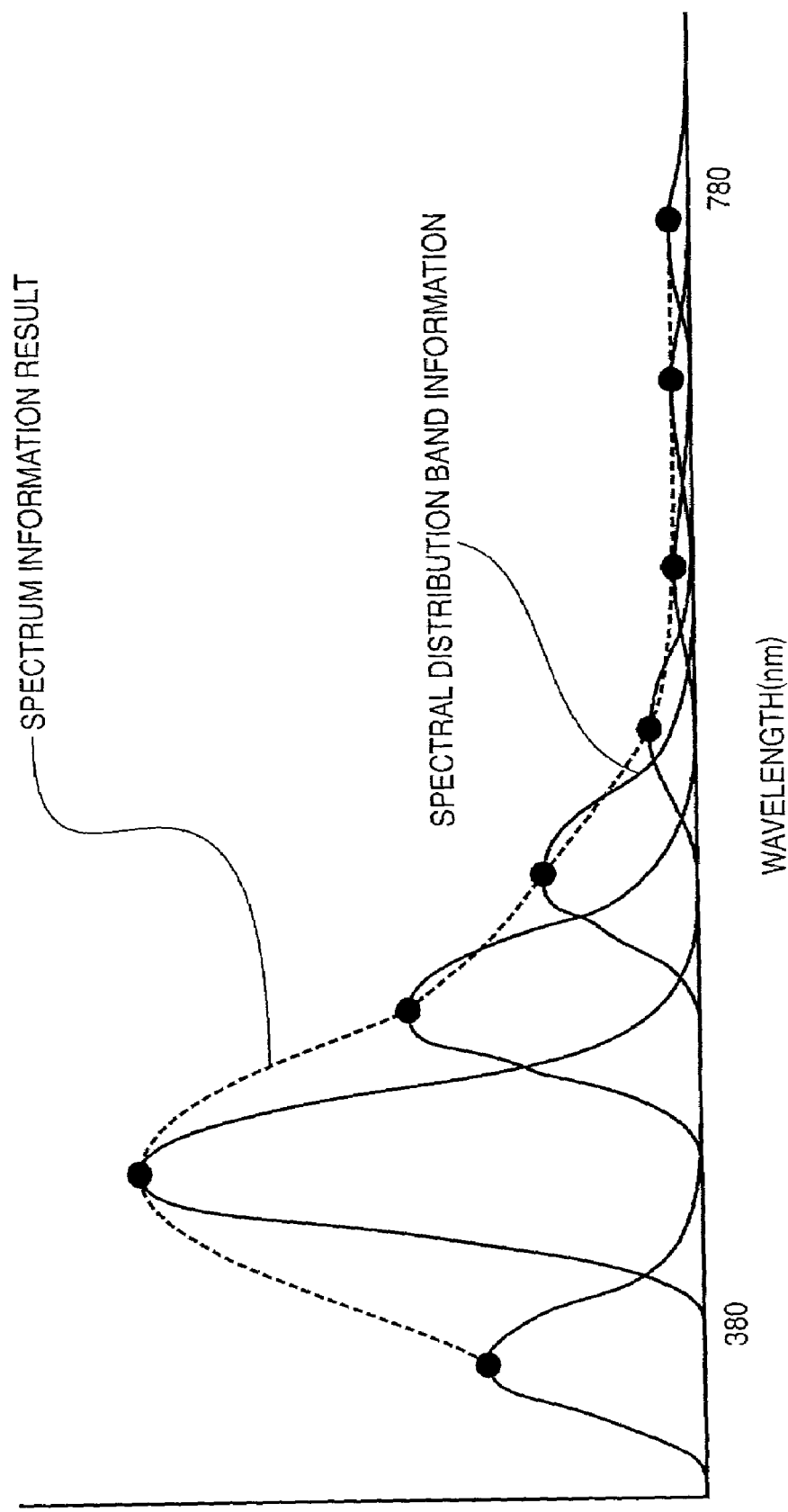
FIG. 4 is a graph showing the acquisition result of eight sets of band information when a bluish color is sensed by the multi-spectrum camera.

Also, filters of the multi-spectrum camera are prepared for all bands necessary to estimate multi-spectral distribution data for all color data. For example, FIG. 4 is a view showing the result of acquisition of eight sets of band information when a bluish color is sensed by the multi-spectrum camera. As shown in FIG. 4, if the spectral distribution of input light is offset to a specific wavelength region, the multi-spectral distribution data is estimated by interpolating four or five sets of band information of the acquired band information, and the remaining four or three sets of band information are redundant.

Figure 5:
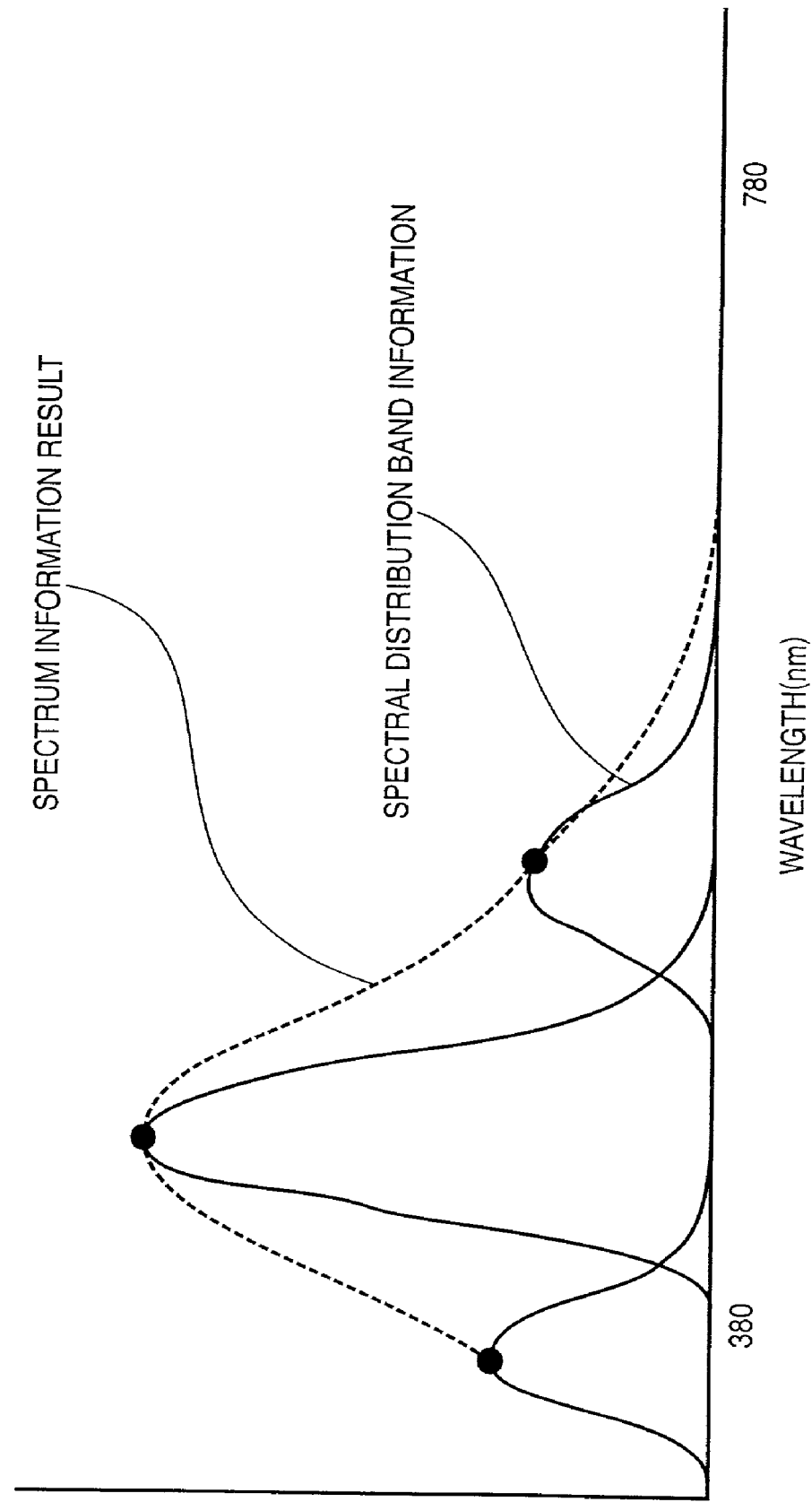
FIG. 5 is a graph showing a method of estimating multi-spectral distribution data in an embodiment.

In this embodiment, the above offset of the spectral distribution is taken into consideration. Therefore, if input light is a bluish color, as shown in FIG. 5, only three sets of band information are acquired, and the multi-spectral distribution data of the input light is estimated by interpolation. Consequently, as shown in FIGS. 4 and 5, it is possible to obtain substantially the same estimation result and reduce the number of sets of band information.

A method of estimating the multi-spectral distribution data from band information other than the above interpolation method is also available. As described in, e.g., "New Version of Color Science Handbook 2nd ed.", page 1196, FIG. 28.29(a), band information required to estimate the multi-spectral distribution data specifying a skin color need only be first to third sets of spectral distribution data as shown in FIG. 6.

Figure 6:
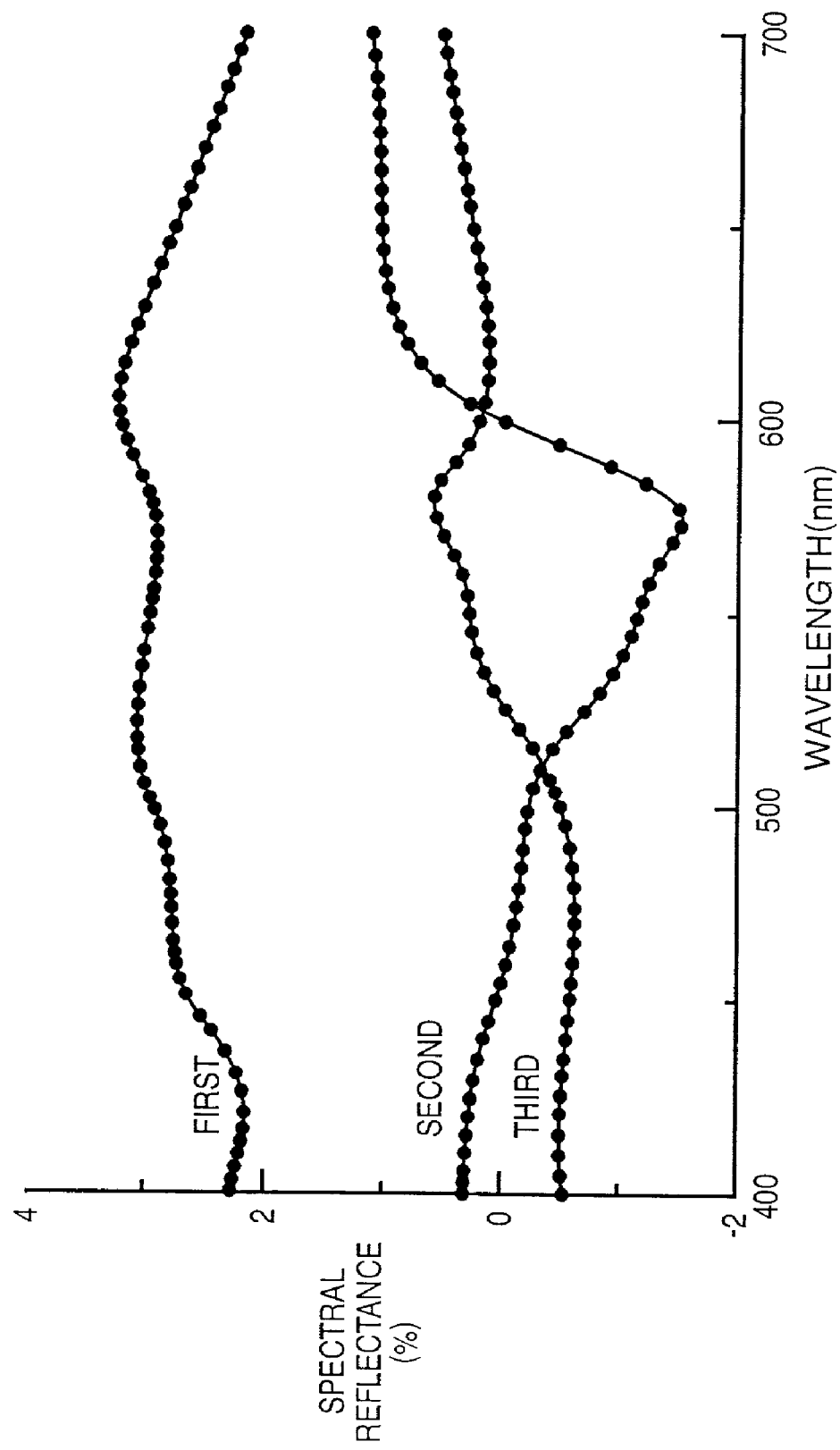
FIG. 6 is a graph for explaining band information necessary to estimate multi-spectral distribution data specifying a skin color.

If color data acquired from an image to be sensed is color data representing a skin color, filters corresponding to those three sets of band information shown in FIG. 6, which are designated by the color data, are selected from a plurality of filters of the multi-spectrum camera. By sensing the image by using each filter and acquiring these three sets of band information, multi-spectral distribution data corresponding to the color data of a skin color can be estimated.

One method of estimating multi-spectral distribution data $R(\lambda)$ corresponding to the color data of a skin color is to use a linear sum.

In this method, the above-mentioned three sets of band information for the multi-spectral distribution data $R(\lambda)$ corresponding to the color data of a skin color are defined as first band information $L1(\lambda)$, second band information $L2(\lambda)$, and third band information $L3(\lambda)$, which are functions concerning the wavelength $\lambda$. The multi-spectral distribution data $R(\lambda)$ corresponding to the color data of a skin color can be estimated by $$R(\lambda) = \sum_{\lambda} \{a1 \cdot L1(\lambda) + a2 \cdot L2(\lambda) + a3 \cdot L3(\lambda)\} \quad (2)$$

where a1, a2, and a3 are arbitrary coefficients which can be different from one wavelength $\lambda$ to another.

Compared to the band information different in wavelength required to estimate the multi-spectral distribution data of a bluish color, the wavelength regions of band information sometimes overlap, as in the case of the three pieces of band information for estimating the multi-spectral distribution data corresponding to a skin color. These three sets of band information for estimating the multi-spectral distribution data corresponding to a skin color are also three main component spectral distribution data for estimating the multi-spectral distribution data corresponding to a skin color.

Similar to the estimation of the multi-spectral distribution data of a bluish color by the interpolation method or the linear sum method, this main component spectral distribution data can be obtained by combining arbitrary band information differing in wavelength.

Accordingly, in order accurately to sense a specific color of high frequency, such as a skin color, it is better not to estimate the multi-spectral distribution data from a large number of sets of band information different in wavelength by using the interpolation method. That is, it is preferable to perform image sensing by the multi-spectrum camera by using a dedicated filter corresponding to a specific color as described above, acquire the main component spectral distribution data, and then estimate the multi-spectral distribution data. In this way, it is possible to reduce the number of filters needed for image sensing and obtain good multi-spectral distribution data estimation results.

In the arrangement of the multi-spectrum camera of the image sensing device 101 according to this embodiment, filter characteristics for use in multi-spectrum camera image sensing have a plurality of band characteristics different in wavelength. The camera is also equipped with dedicated filters for previously defined specific colors. By giving band information to these dedicated filters, it is possible equally to handle the filters having band characteristics different in wavelength and these dedicated filters for previously defined specific colors.

Accordingly, in the selection of filters for multi-spectrum camera image sensing by the image sensing device 101 or in the selection of band information when image data from the image sensing device 101 is stored into the data storage unit 105, necessary sets of band information are made to correspond to color data beforehand, and band information designated by acquired color data is selected.

[Operation of Image Sensing Device]

On the rotary filter of the multi-spectrum camera sensing unit 103, filters corresponding to band information necessary to estimate the multi-spectral distribution data of color data are arranged in accordance with band numbers. Also, for color data (for a color designated by color data) sensed by the color data sensing unit 102, sets of band information necessary to estimate the multi-spectral distribution data are defined beforehand. By designating a band number, the defined band information can be acquired by using a filter corresponding to the band number.

That is, a look-up table as shown in FIG. 7 defines the band numbers and the number of sets of band information necessary to estimate the multi-spectral distribution data of color data in the image sensing device 101.

Also, a look-up table as shown in FIG. 8 defines those filter numbers of the multi-spectrum camera sensing unit 103, which correspond to the band numbers in the image sensing device 101, and the spectral distribution characteristics of these filters.

Figure 9:
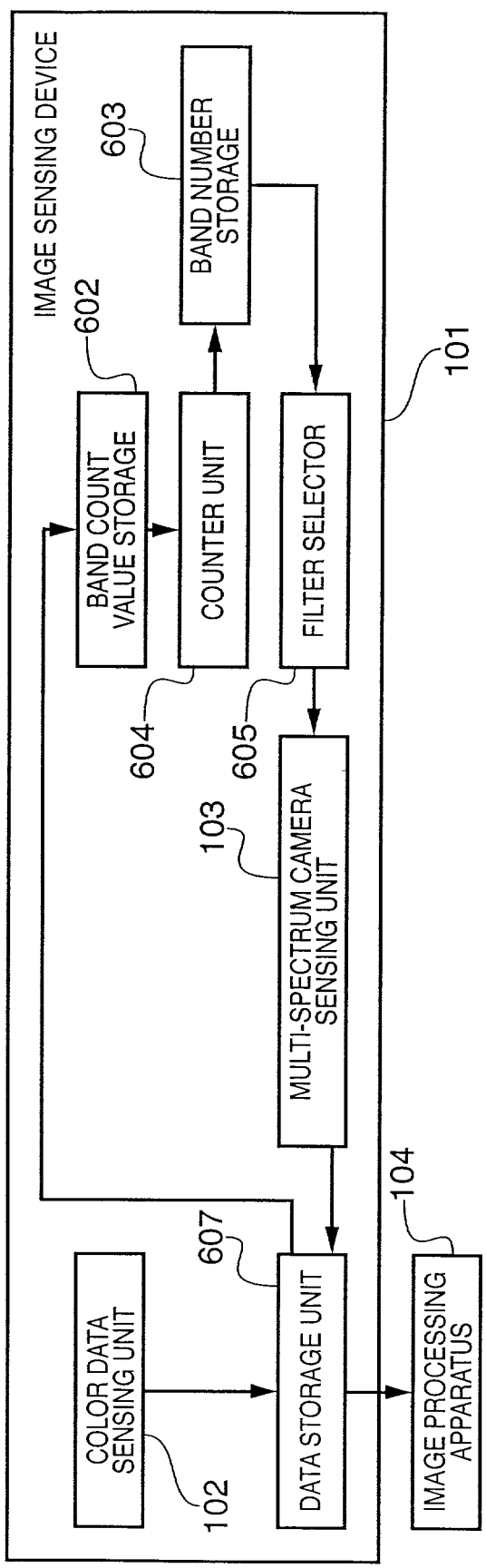
FIG. 9 is a block diagram showing detailed functions of the image sensing device.
Figure 10:
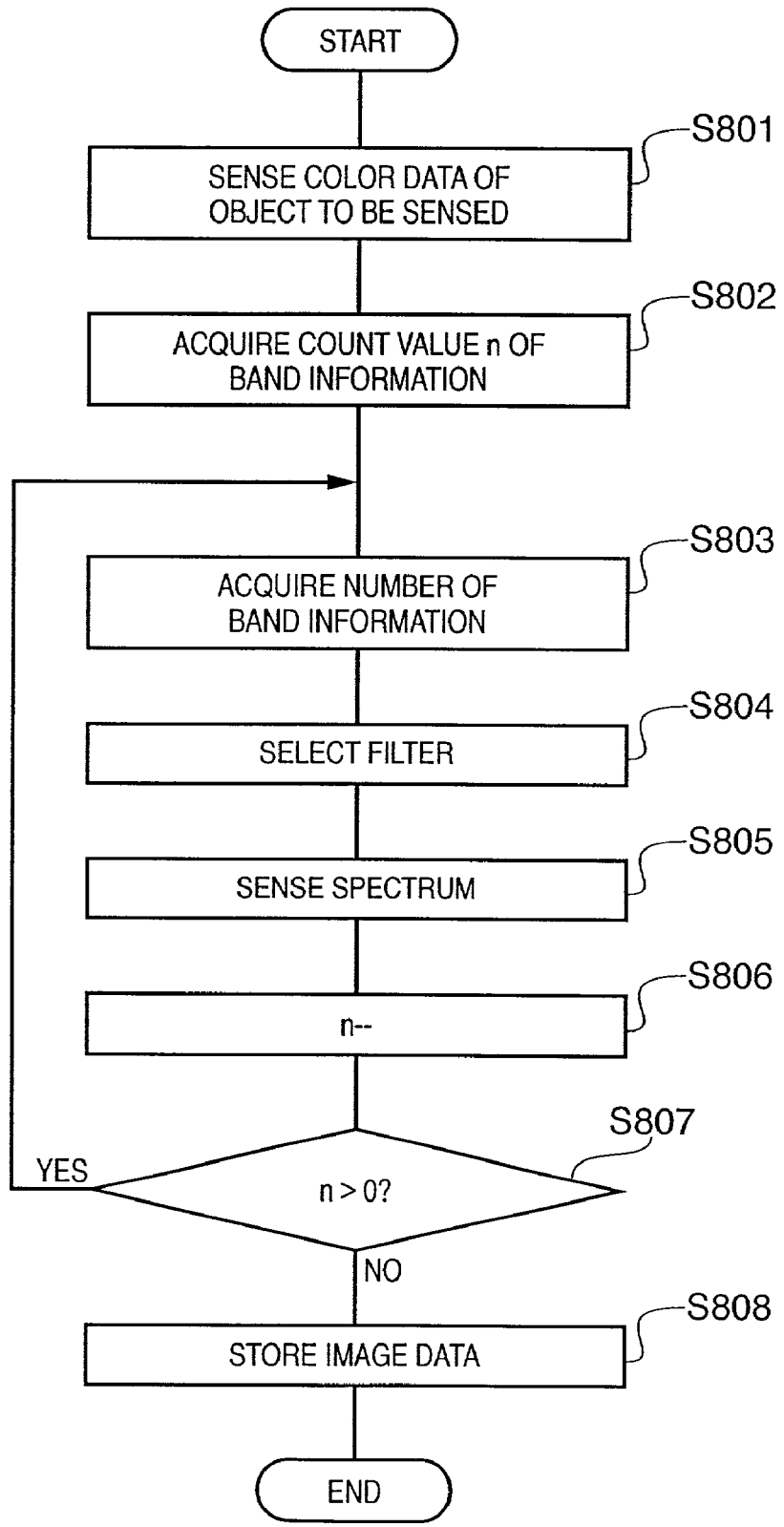
FIG. 10 is a flow chart showing the image sensing procedure of the image sensing device.

FIG. 9 is a block diagram showing detailed functions of the image sensing device 101. FIG. 10 is a flow chart showing the image sensing procedure of the image sensing unit 101. Note that the look-up tables shown in FIGS. 7 and 8 are stored in a band count value storage 602 and a band number storage 603, respectively.

In step S801, the color data sensing unit 102 acquires the color data of each pixel to be sensed, and the acquired color data of each pixel is stored in a data storage unit 607.

In step S802, the number of sets of band information necessary to estimate the multi-spectral distribution data is acquired as a count value n from the band count value storage 602 by referring to the acquired color data, and is set in a counter unit 604. Subsequently, in step S803 a band number corresponding to a count value n−1 is acquired from the band number storage 603. In step S804, the acquired band number is supplied to a filter selector 605 to select a filter corresponding to the band number. Consequently, the rotary filter rotates to set the selected filter in front of the CCD sensor of the multi-spectrum camera sensing unit 103.

In step S805, the multi-spectrum camera sensing unit 103 senses a spectrum. In step S806, the counter unit 604 decrements the count value n. In step S807, whether count value n>0 is checked, and the processing from step S803 to step S806 is repeated the same number of times as the number of the band information.

After spectrum sensing is performed the same number of times as the number of band information, the flow advances to step S808, and the band information (spectral distribution data) equal in number to the bands corresponding to the acquired color data are stored as image data in the data storage unit 607.

The process shown in the flow chart of FIG. 10 is repetitively performed for all pixels. The acquired color data and the band information equal in number to the bands corresponding to the color data are output to the image processing apparatus 104.

The image sensing device 101 can also perform the following processing. That is, in the steps after the acquisition of the color data in step S801, all filters of the multi-spectrum camera are used to acquire the spectral distribution data of all pixels. When this data from the image sensing device 101 is stored into the data storage unit 105, only that spectral distribution data of each pixel of an input image, which is defined by the acquired color data, is stored. After that, image processing using the spectral distribution data of each pixel stored in the data storage unit 105 is similarly performed.

[Operation of Image Processing Apparatus]

The processing of the image processing apparatus by which the multi-spectral distribution data of each pixel is estimated from the image data acquired by the image sensing unit 101 and output to the output device 112 will be described next.

Figure 11:
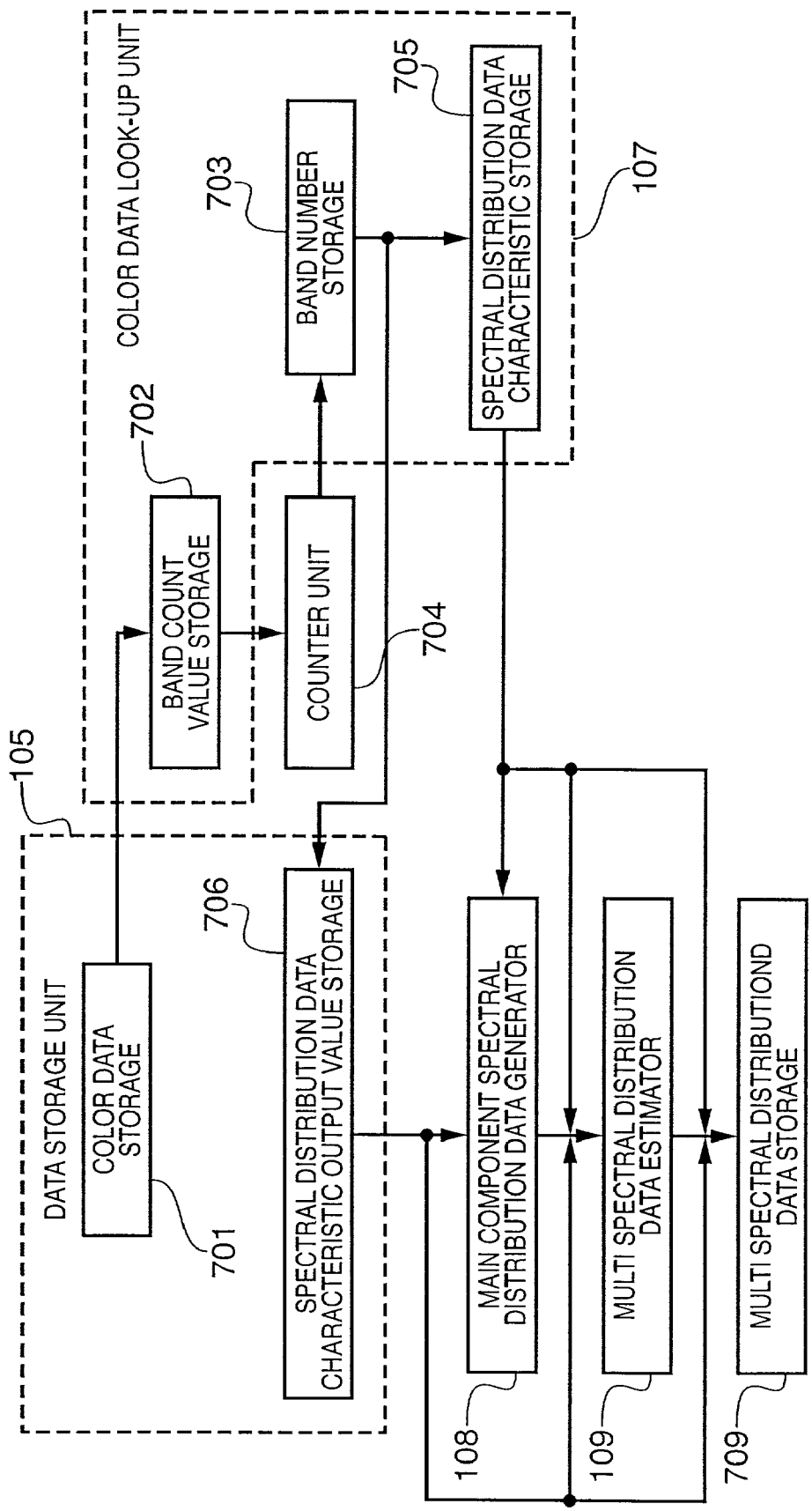
FIG. 11 is a block diagram showing detailed functions of the image processing apparatus.
Figure 12:
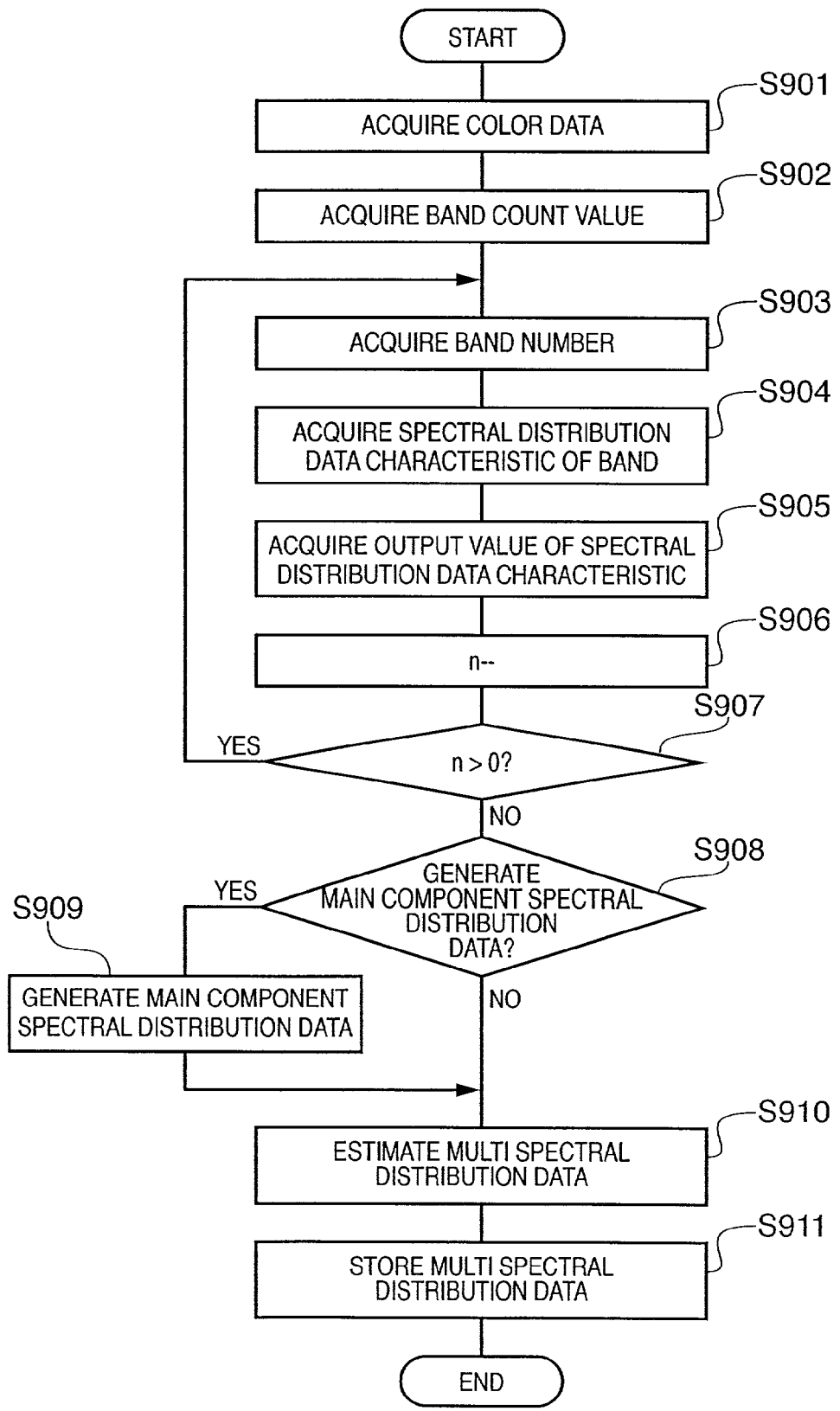
FIG. 12 is a flow chart showing the process procedure of the image processing apparatus.

FIG. 11 is a block diagram showing detailed functions of the image processing apparatus 104. FIG. 12 is a flow chart showing the process procedure of this image processing apparatus 104. Note that of the input image data from the image sensing device 101, the color data of each pixel is stored in a color data storage 701 of the data storage unit 105, and the band information of each pixel is stored in a spectral distribution data characteristic output value storage 706 of the data storage unit 105.

Note also that look-up tables as shown in FIGS. 7 and 8 are stored in a band count value storage 702 and a band number storage 703, respectively, of the color data look-up unit 107. These look-up tables can also be acquired from the band count value storage 602 and the band number storage 603 of the image sensing device 101 and stored in the color data look-up unit 107.

In step S901, the multi-spectral distribution data estimation processor 106 reads out the color data of a pixel of interest from the color data storage 701. In step S902, the multi-spectral distribution data estimation processor 106 refers to the color data and acquires from the band count value storage 702 a count value n as the number of band information required to estimate the multi-spectral distribution data. In step S903, the multi-spectral distribution data estimation processor 106 acquires from the band number storage 703 a band number corresponding to the count value.

On the basis of the acquired band number, the multi-spectral distribution data estimation processor 106 acquires the band spectral distribution data characteristic from a spectral distribution data characteristic storage 705 in step S904, and reads out the band information from the spectral distribution data characteristic output value storage 706 in step S905.

In step S906, a counter unit 704 decrements the count value n. In step S907, a check is made as to whether count value n>0, and the processing from step S903 to step S905 is repeated the same number of times as the number of the band information.

Although not shown in the table shown in FIG. 7, spectral distribution data configuration information or the like for designating the generation of an arbitrary number of main component spectral distribution data for estimating the multi-spectral distribution data from the "band spectral distribution data characteristic and band information" with respect to the color data is defined beforehand. This spectral distribution data configuration information includes main component spectral distribution data generation designation information, the number of main component spectral distribution data, band configuration information necessary to generate each of the main component spectral distribution data, coefficient information necessary to generate each of the main component spectral distribution data, and each main component spectral distribution data for estimating the multi-spectral distribution data corresponding to the color data.

If in step S908 it is determined by referring to the color data that the generation of the main component spectral distribution data is not designated, the band spectral distribution data characteristics acquired in step S904 and the band information acquired in step S905 are supplied to the multi-spectral distribution data estimator 109.

On the other hand, if in step S908 it is determined by referring to the color data that the generation of the main component spectral distribution data is designated, the band spectral distribution data characteristics acquired in step S904 and the band information acquired in step S905 are supplied to the main component spectral distribution data generator 108.

In step S909, on the basis of the "band spectral distribution data characteristics and band information" defined by the color data, the main component spectral distribution data generator 108 generates the designated main component spectral distribution data for estimating the multi-spectral distribution data, by referring to the number of main component spectral distribution data, band configuration information necessary to generate each main component spectral distribution data, and coefficient information necessary to generate each main component spectral distribution data. Note that the main component spectral distribution data can be obtained by, e.g., interpolating the band spectral distribution data characteristics configuring the selected main component spectral distribution data defined by the color data.

By using the "band spectral distribution data characteristics and band information" equal in number to the band information acquired in steps S904 and S905, or by using the spectral distribution data for estimating the multi-spectral distribution data corresponding to the color data including the main component spectral distribution data generated in step S909, in step S910 the multi-spectral distribution data estimator 109 estimates the multi-spectral distribution data of a pixel of interest on the basis of the spectral distribution data for estimating the multi spectral distribution data corresponding to the color data including the generated main component spectral distribution data, or on the basis of the "band spectral distribution data characteristics and band information". In step S911, the estimated multi-spectral distribution data is stored in the multi-spectral distribution data storage 709. Note that the multi-spectral distribution data can be estimated by using each main component spectral distribution data and/or the linear sum method using the band spectral distribution data characteristics and band information.

The processing indicated by the flow chart in FIG. 12 is repeatedly performed for all pixels to calculate the multi-spectral distribution data of each pixel of the input image. This multi-spectral distribution data is stored in a multi-spectral distribution data storage 709.

Figure 16:
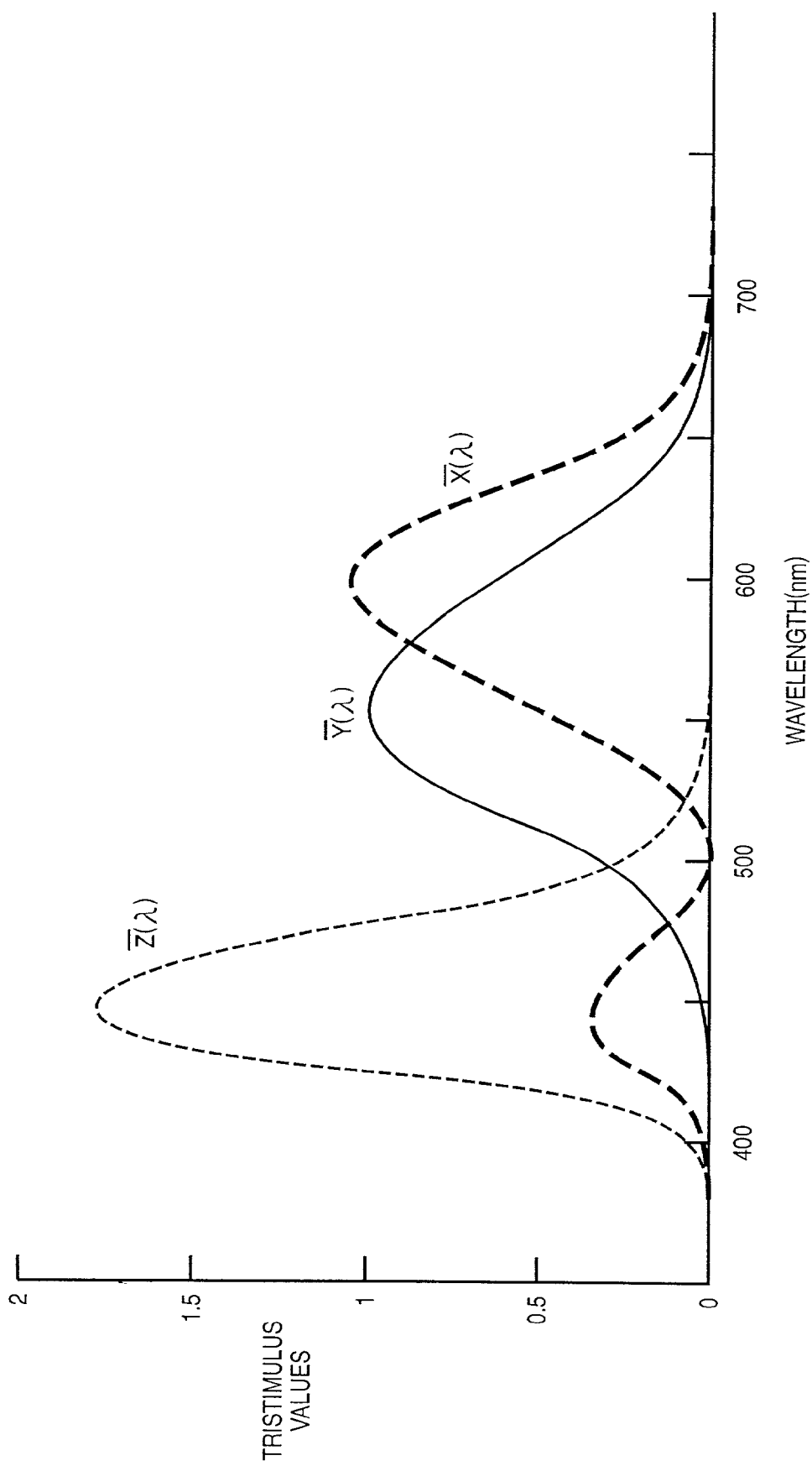
FIG. 16 is a graph showing a color matching function in the XYZ calorimetric system.

By using that multi-spectral distribution data of each pixel of the input image, which is estimated by the above processing, the image processing apparatus 104 causes the color converter 110 to perform color conversion for the multi-spectral distribution data to obtain a desired output result, thereby obtaining the converted multi-spectral distribution data. In addition, the color data converter 111 integrates the multi-spectral distribution data converted by the color converter 110, by a convolution operation using a color matching function of an appropriately selected colorimetric system, thereby converting it into color vector data having three values. As this color vector data having three values, color space data unique to a device such as the L*a*b* calorimetric system or the XYZ colorimetric system is generally selected. FIG. 16 shows a color matching function in the XYZ calorimetric system, as an example of a color matching function.

The obtained color vector data having three values is transmitted from the image processing apparatus 104 to the output device 112. The output device 112 converts the color vector data having three values into output signal data, which is optimum in an observation environment, of this output device 112.

Examples of the output device 112 are a display using an RGB signal values, a printer using CMYK signal values, and a display and printer using multicolor signal values other than RGB and CMYK. This output device has a function, such as a color management system (CMS), for obtaining an appropriate output, by taking account of the output characteristics of the output device, with respect to the three-valued color data. Therefore, the color data converter 111 uses this CMS to generate an output signal appropriate for the output device 112.

By the above processing, it is possible to set the bands and the number of the bands, corresponding to a color specified by the color data of an input image, of spectral distribution data to be sensed by the multi-spectrum camera, and to estimate the spectral distribution data from this band information. In addition, the spectral distribution data is estimated by changing the band information and the number of the band information in accordance with the color data value, thereby realizing image signal processing using multi-spectral distribution data.

[Compression Process]

When the color data and the band information are transmitted from the image sensing device 101 to the image processing apparatus 104, if a data compressor for compressing the band information is used to compress the data amount of the band information (image data) as small as possible and transfer the compressed data, the time of the data transfer can be shortened. A data expander for expanding the compressed band information is of course prepared in the image processing apparatus 104 to restore the compressed band information and store the restored band information in the data storage unit 105.

The process of compressing image data having multi-spectral distribution data or compressing band information will be explained below.

Figure 13:
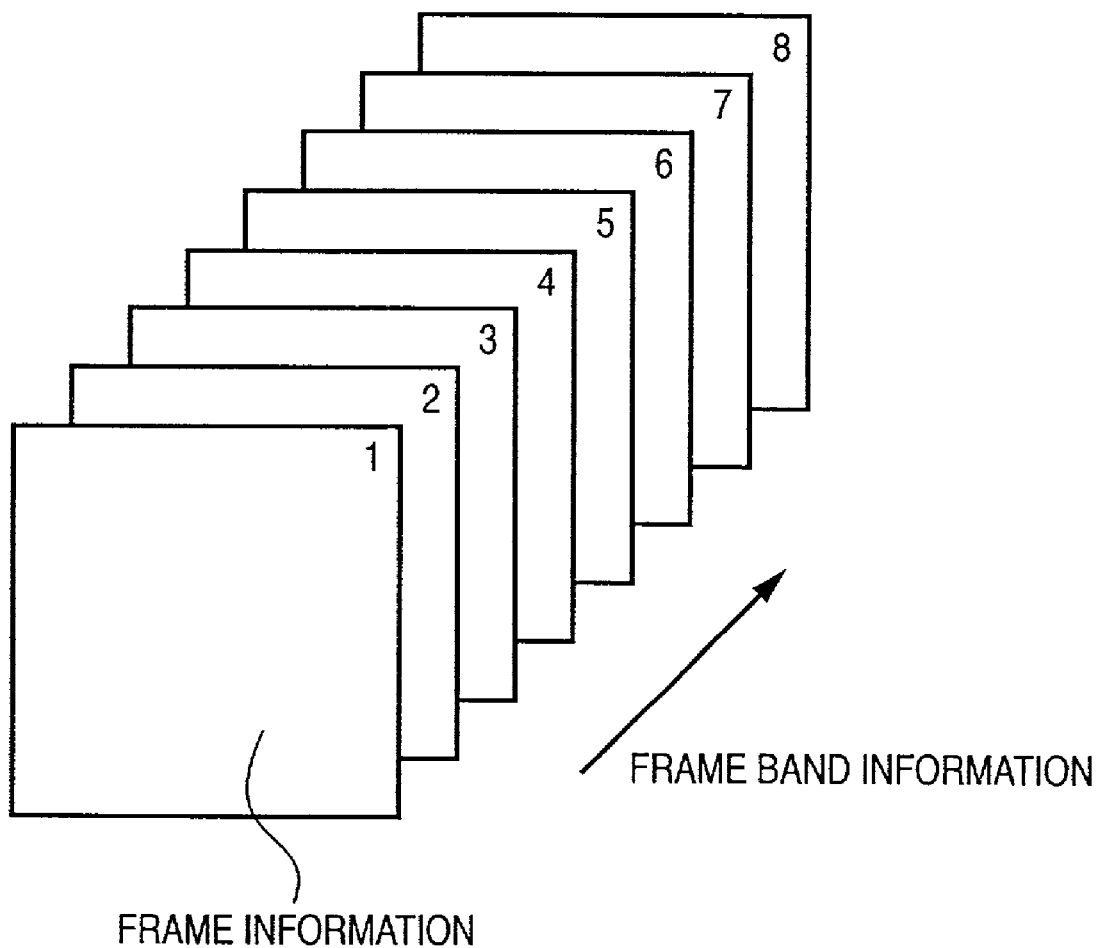
FIG. 13 is a view showing the relationship between multi-spectral distribution data and frame band information.

FIG. 13 is a view showing the relationship between multi-spectral distribution data and frame band information. To acquire the band information of each pixel, one frame band information is acquired for one wavelength.

Figure 14:
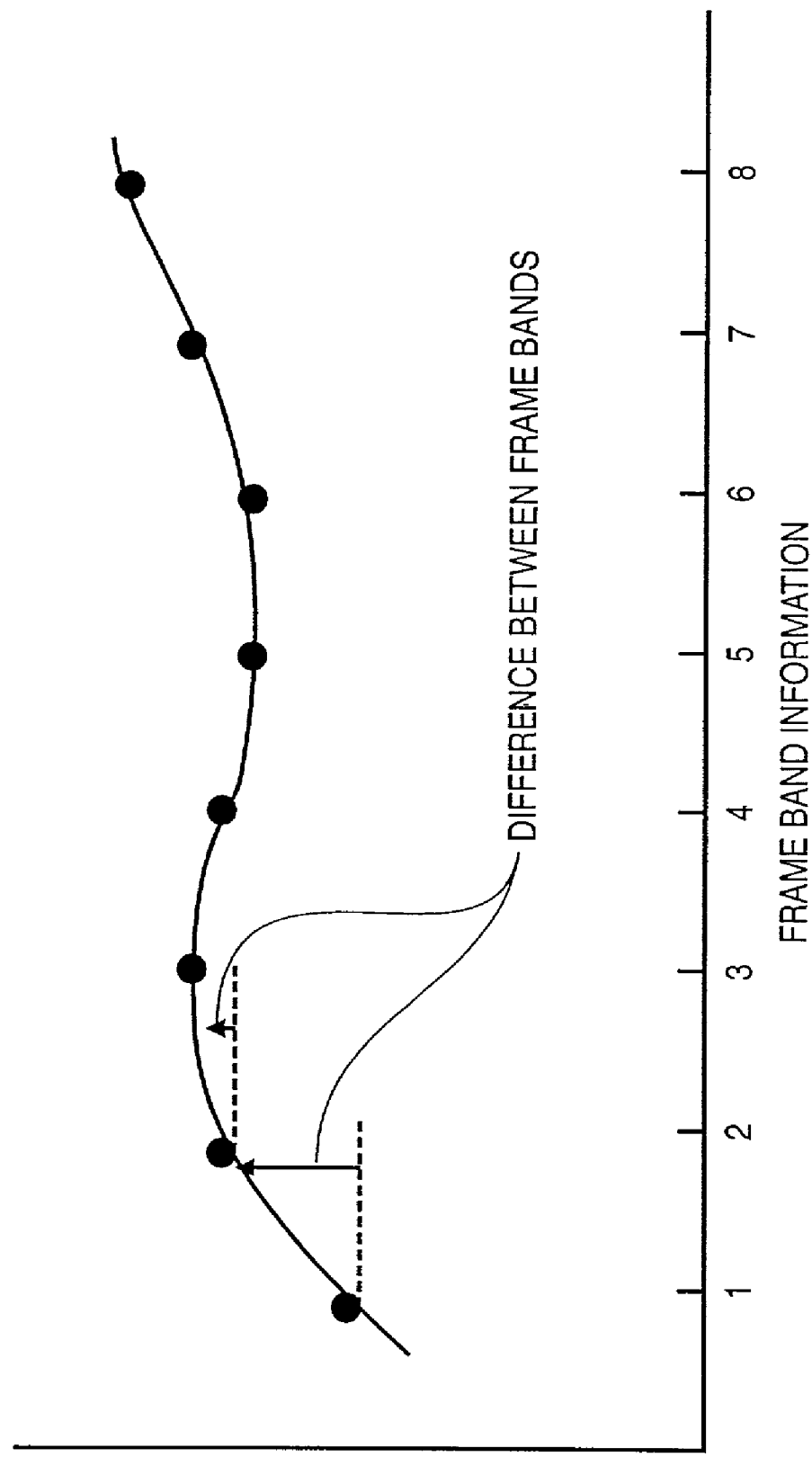
FIG. 14 is a graph for explaining the process of compressing band information.

Noting the band information of a pixel of interest in each frame, differences between adjacent pieces of frame band information are obtained, and correlations (FIG. 14) between these pieces of frame band information are extracted. Next, differences between pixels are obtained in the band information of one frame, and correlations between these pixels in the one-frame band information are extracted. On the basis of the correlations between the pieces of frame band information and the correlations between the pixels in the one-frame band information, optimum encoding is performed. Consequently, spectral distribution data can be efficiently compressed.

Compared to the compression of the spectral distribution data described above, the compression of the spectral distribution data characteristics does not always require frame band information but need only use data of each wavelength. Therefore, differences between data of different wavelengths of the spectral distribution data characteristics are obtained and properly encoded. In this manner, the spectral distribution data characteristics can be efficiently compressed.

In this embodiment as described above, the multi-spectral distribution data can be obtained by acquiring the spectral distribution band information by using a filter which is designated by the acquired color data of each pixel and has an arbitrary number of spectral distribution characteristics, without using all filters mounted on the multi-spectrum camera. Accordingly, it is possible to minimize the output data amount from the multi-spectrum camera and the load (time) of image sensing.

In addition, in the image processing which outputs image data constructed by an input color data value and spectral distribution data, the configuration of the spectral distribution data is defined in accordance with the color data value. This makes it possible to estimate the spectral distribution data of an object by using a minimum spectral distribution band information configuration. Therefore, the processing load (processing time) of the image processing can be reduced.

Furthermore, in image data constructed by an input color data value and spectral distribution data, the configuration of the spectral distribution data is defined in accordance with the color data value. Therefore, the spectral distribution data can be estimated by using minimum spectral distribution band information corresponding to the color data. This makes it possible to reduce the processing load (processing time) of the estimation and provide an image processing apparatus which accurately reproduces the color of object.

Modifications

Figure 15:
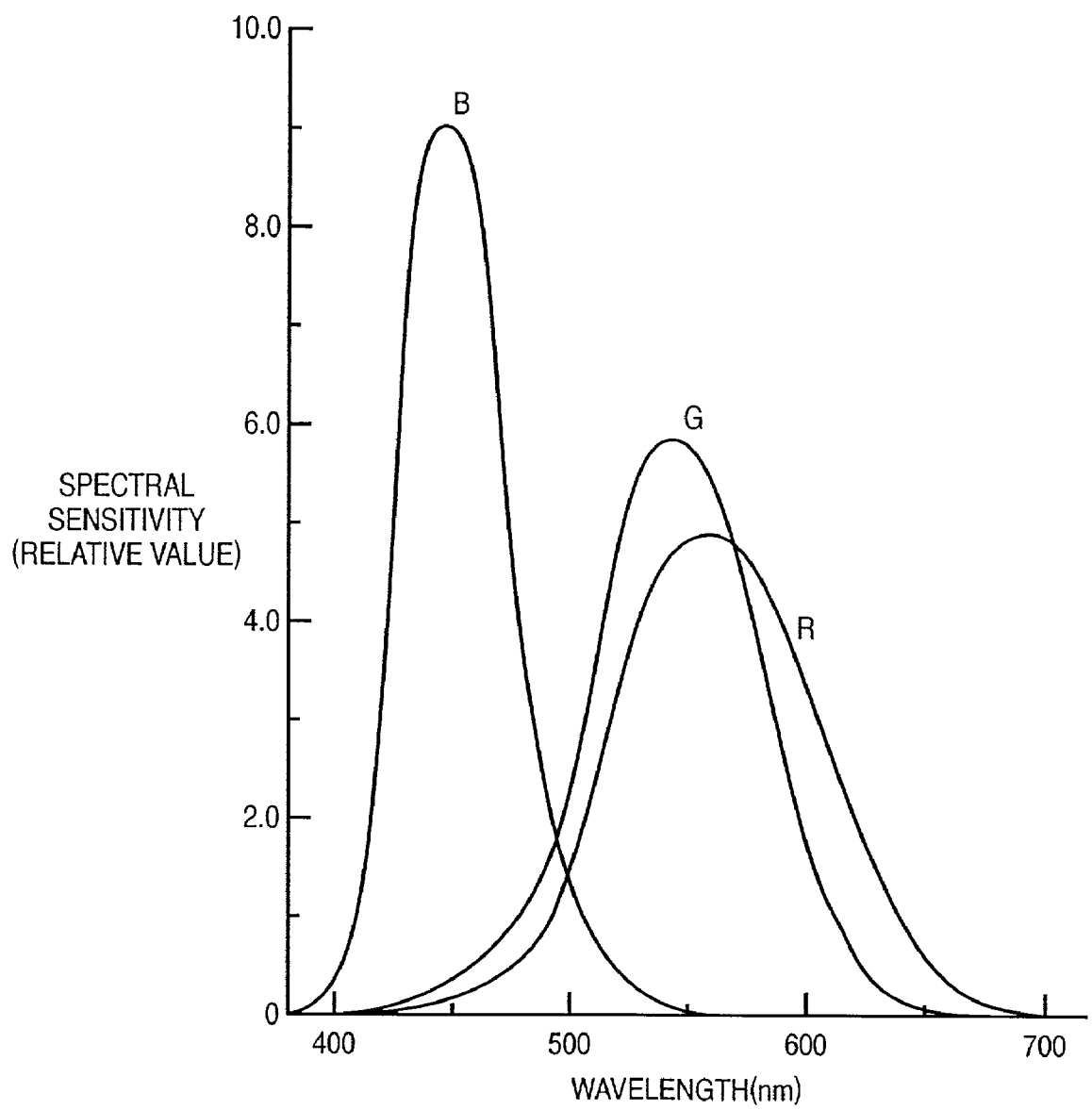
FIG. 15 is a graph showing the spectral characteristic data of RGB.

The spectral distribution data as output band information from the multi-spectrum camera includes output values of a plurality of wavelength data output values. In this embodiment, of an arbitrary number of wavelength data in the spectral distribution data, the spectral characteristic data of color data need only be obtained for at least three wavelength data. For example, three sets of wavelength data from a plurality of sets of arbitrary wavelength data in the spectral distribution data can be RGB spectral characteristic data shown in FIG. 15. Instead of this RGB spectral characteristic data, a data configuration directly having RGB values as color data can also be used.

In the above embodiment, the acquisition of color data by a discrete sensor is explained as an example. However, it is also possible to obtain an output value having the spectral characteristic data of color data by the multi-spectrum camera, calculate the color data from the obtained output value, and perform the above processing for this calculated color data.

This embodiment is not restricted to the use of the multi-spectrum camera using the rotary filter but can also be a multi-spectrum camera comprising an area sensor in which filters sensitive to a plurality of wavelengths are arranged. Furthermore, the embodiment can also be a multi-spectrum camera which switches a plurality of light sources each for emitting light having a specific wavelength and which comprises a line sensor in which filters sensitive to a plurality of wavelengths are switched. That is, the embodiment need only be a multi-spectrum camera capable of acquiring band information having predetermined spectral distribution data characteristics, regardless of the optical arrangement of the camera.

As many apparently widely different embodiments of the present invention can be made without departing from the spirit and scope thereof, it is to be understood that the invention is not limited to the specific embodiments thereof except as defined in the appended claims.

The invention claimed is:

1. An image processing apparatus comprising:
a first acquisition section, arranged to acquire color data of an object;
a second acquisition section, arranged to acquire spectral distribution data of the object, which represents a portion of a plurality of bands into which a total wavelength region is divided, and which is necessary to estimate spectral distribution data of the total wavelength region, from a plurality of spectral distribution data in accordance with the acquired color data; and
an estimator, arranged to estimate the spectral distribution data of the total wavelength region on the basis of the spectral distribution data acquired by said second acquisition section.

2. The apparatus according to claim 1, wherein the spectral distribution data acquired by said second acquisition section is defined as a combination of the plurality of spectral distribution data.

3. The apparatus according to claim 1, further comprising a generator arranged to generate the spectral distribution data of the total wavelength region from the color data acquired by said first acquisition section and the spectral distribution data of the total wavelength region estimated by said estimator.

4. The apparatus according to claim 1, wherein a configuration of the spectral distribution data acquired by said second acquisition section, which is necessary to estimate spectral distribution data of color data, of color data, is predetermined.

5. The apparatus according to claim 1, wherein the spectral distribution data acquired by said second acquisition section is arbitrarily changeable.

6. An image processing method comprising the steps of:
acquiring color data of an object;
acquiring spectral distribution data of the object, which represents a portion of a plurality of bands into which a total wavelength region is divided, and which is necessary to estimate spectral distribution data of the total wavelength region, from a plurality of spectral distribution data in accordance with the acquired color data; and
estimating the spectral distribution data of the total wavelength region on the basis of the spectral distribution data acquired in the second acquiring step.

* * * * *

UNITED STATES PATENT AND TRADEMARK OFFICE
CERTIFICATE OF CORRECTION

| | |
|---|---|
| PATENT NO. | : 7,251,359 B2 |
| APPLICATION NO. | : 10/006724 |
| DATED | : July 31, 2007 |
| INVENTOR(S) | : Yoshiko Iida et al. |

It is certified that error appears in the above-identified patent and that said Letters Patent is hereby corrected as shown below:

SHEET 11:

Figure 11, "DISTRIBUTIOND" should read --DISTRIBUTION--.

COLUMN 2:

Line 20, "an" should read --$a_n$--; and
Line 21, "another" should read --another.--.

COLUMN 6:

Line 4, "accurately to" should read --to accurately--.

COLUMN 8:

Line 67, "multi spectral" should read --multi-spectral--.

COLUMN 9:

Line 39, "an" should be deleted.

COLUM 10:

Line 58, "object" should read --an object--.

UNITED STATES PATENT AND TRADEMARK OFFICE
CERTIFICATE OF CORRECTION

| | | |
|---|---|---|
| PATENT NO. | : 7,251,359 B2 | Page 2 of 2 |
| APPLICATION NO. | : 10/006724 | |
| DATED | : July 31, 2007 | |
| INVENTOR(S) | : Yoshiko Iida et al. | |

It is certified that error appears in the above-identified patent and that said Letters Patent is hereby corrected as shown below:

COLUMN 12:

Line 20, "of color data," should be deleted.

Signed and Sealed this

Tenth Day of June, 2008

JON W. DUDAS
*Director of the United States Patent and Trademark Office*